(12) United States Patent
Tachiiwa

(10) Patent No.: US 8,944,652 B2
(45) Date of Patent: Feb. 3, 2015

(54) OPTICAL AXIS ADJUSTING SCREW

(75) Inventor: Takeyuki Tachiiwa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 787 days.

(21) Appl. No.: 13/022,093

(22) Filed: Feb. 7, 2011

(65) Prior Publication Data

US 2011/0192243 A1 Aug. 11, 2011

(30) Foreign Application Priority Data

Feb. 9, 2010 (JP) .................................. 2010-026359

(51) Int. Cl.
| | | |
|---|---|---|
| F21V 19/02 | (2006.01) | |
| F21V 21/14 | (2006.01) | |
| B60Q 1/068 | (2006.01) | |
| B29C 45/00 | (2006.01) | |
| B29C 45/26 | (2006.01) | |

(52) U.S. Cl.
CPC .......... B60Q 1/0683 (2013.01); B29C 45/0025 (2013.01); B29C 45/261 (2013.01); B29C 2045/0034 (2013.01)
USPC ........................................... 362/524; 254/95

(58) Field of Classification Search
USPC ......... 74/89.23; 326/487, 506, 507, 523, 524, 326/528–532, 536; 254/95–97, 99, 254/100–103; 362/487, 506, 507, 523, 524, 362/528–532, 536
See application file for complete search history.

(56) References Cited

U.S. PATENT DOCUMENTS

| | | | | |
|---|---|---|---|---|
| 4,858,754 A | * | 8/1989 | Wright et al. | 206/5.1 |
| 5,178,264 A | * | 1/1993 | Russell, II | 200/503 |
| 5,437,646 A | * | 8/1995 | Hunt et al. | 604/167.04 |
| 6,036,341 A | * | 3/2000 | Dobler et al. | 362/524 |
| 6,071,581 A | * | 6/2000 | Nomura et al. | 428/36.9 |
| 6,746,142 B2 | * | 6/2004 | Shirai | 362/524 |
| 6,821,604 B2 | * | 11/2004 | Kasuga et al. | 428/156 |
| 6,871,989 B2 | * | 3/2005 | Nakazawa et al. | 362/515 |
| 6,939,252 B1 | * | 9/2005 | Stanczak et al. | 473/383 |
| 7,052,164 B2 | * | 5/2006 | Burton | 362/507 |
| 7,153,012 B2 | * | 12/2006 | Sakurai | 362/523 |
| 7,516,861 B2 | * | 4/2009 | Itou et al. | 215/44 |
| 2001/0036080 A1 | * | 11/2001 | Shirai | 362/460 |
| 2004/0241274 A1 | * | 12/2004 | Odajima et al. | 425/389 |

(Continued)

FOREIGN PATENT DOCUMENTS

| | | |
|---|---|---|
| EP | 1150064 A1 | 10/2001 |
| FR | 2692189 A1 | 12/1993 |
| JP | 2002-193023 A | 7/2002 |

OTHER PUBLICATIONS

Extended European Search Report for European Application No. 11153828.6 mailed May 30, 2011 (6 pages).

(Continued)

Primary Examiner — Troy Chambers
Assistant Examiner — Alexander Vu
(74) Attorney, Agent, or Firm — Osha Liang LLP

(57) ABSTRACT

An optical axis adjusting screw (15) is provided with a shaft portion (16), a gear portion (17), and an elastic engagement portion (18). The elastic engagement portion (18) is provided with a base end (18BE) and a free end (18FE). The base end (18BE) is fixed to the shaft portion (16). A distal end face (18a) is formed at the free end (18FE) and is substantially perpendicular to an axial direction of the shaft portion (16). There is no parting line on the distal end face (18a).

3 Claims, 4 Drawing Sheets

(56) References Cited

U.S. PATENT DOCUMENTS

| | | | |
|---|---|---|---|
| 2006/0092653 A1* | 5/2006 | Tachiiwa et al. | 362/507 |
| 2006/0278037 A1* | 12/2006 | Borbe et al. | 74/640 |
| 2007/0014954 A1* | 1/2007 | Yokoi | 428/36.9 |
| 2007/0065064 A1* | 3/2007 | Kitamura et al. | 384/537 |
| 2011/0192243 A1* | 8/2011 | Tachiiwa | 74/89.23 |

OTHER PUBLICATIONS

English abstract of JP2002193023 published on Jul. 10, 2002, espacenet database, 1 page.

* cited by examiner

OPTICAL AXIS ADJUSTING SCREW

BACKGROUND OF THE INVENTION

1. Field of the Invention

The present invention relates town optical axis adjusting screw which can prevent a generation of foreign matters due to a sliding motion during an optical axis adjusting operation for adjusting an irradiating direction of a lamp unit in a vehicle headlamp.

2. Related Art

In vehicle headlamps, there is, for example, a type in which a lamp unit having a light source is disposed in an interior space of a lamp outer casing which is made up of a cover and a lamp body.

In vehicle headlamps of this type, there is a vehicle headlamp in which an aiming adjustment which is an initial adjustment of a light irradiating direction is enabled by an optical axis adjusting mechanism (refer to JP-A-2002-193023, for example).

In the vehicle headlamp described in JP-A-2002-193023, an optical axis adjusting mechanism supports a lamp unit at three support points which are spaced apart vertically and horizontally so that the lamp unit is tilted freely relative to a lamp body. Optical axis adjusting screws are provided on the optical axis adjusting mechanism, and these optical axis adjusting screws function as two of the three support points.

The optical axis adjusting screws are formed by integrally molding, through injection molding which employs a mold, a shaft portion having a shaft-like shape and extending in a front-rear direction, a gear portion which is connected to a rear end of the shaft portion, and a pair of elastic engagement portions which project outwards from a position on the shaft portion which lies closer to a rear end.

The shaft portion includes a threaded portion which is brought into meshing engagement with a screw support portion which is provided in the lamp unit and a support shaft portion which is supported rotatably on the lamp body.

The elastic engagement portions is inserted into a support hole formed in the lamp body from a rear side, and the optical axis adjusting screws are rotatably supported on the lamp body by the shaft portion. In order to insert the elastic engagement portions into the support hole in the lamp body, the pair of elastic engagement portions are elastically deformed in a direction in which the elastic engagement portions approach each other. The elastic engagement portions are elastically restored to their initial positions when they are entirely inserted through the support hole, whereby respective rear surfaces of the elastic engagement portions are brought into contact with an inner surface of the lamp body. Consequently, the optical axis adjusting screws are prevented from being dislodged to the rear side relative to the lamp body by the elastic engagement portions being brought into contact with the inner surface of the lamp body.

In the vehicle headlamp configured in the way described above, when the gear portion of the optical axis adjusting screw is operated to rotate, the screw support portion is fed in a direction corresponding to the rotating direction of the gear portion, whereby the lamp unit is tilted relative to the lamp body on the other two support points as fulcrums. Thus, an optical axis adjustment (an aiming adjustment) is effected so as to adjust the irradiating direction of light.

As has been described above, the optical axis adjusting screw is formed integrally by the injection molding which employs the mold, and the mold is formed by a pair of dies which are opened and closed in a direction which is at right angles to an axial direction of the shaft portion.

Consequently, parting lines extending in the axial direction of the shaft portion are formed on the optical axis adjusting screw, and a parting line is formed also on the rear surfaces of the pair of elastic engagement portions at centers in a left-right direction.

In the event that the parting line is formed on the rear surfaces of the elastic engagement portions, when the optical axis adjusting screw is rotated relative to the lamp body during an adjusting operation of the optical axis, the parting line on the rear surface of the elastic engagement portion would caused to slide against an inner surface of the lamp body, whereby foreign matters such as abrasion dust may be generated or the inner surface of the lamp body may be abraded.

SUMMARY OF THE INVENTION

One or more embodiments of the invention provide an optical axis adjusting screw which can prevent a generation of foreign matters produced during an optical axis adjusting operation.

In accordance with one or more embodiments of the invention, an optical axis adjusting screw 15 is provided with: a shaft portion 16 including a threaded portion 19a and a support shaft portion 21; a gear portion 17 connected to the shaft portion 16; and an elastic engagement portion 18. The elastic engagement portion 18 is provided with: a base end 18BE fixed to an outer circumferential surface of the shaft portion 16; a free end 18FE at an opposite side of the base end 18BE in an axial direction of the shaft portion 16; an opposed surface 18b which is apart from the outer circumferential surface of the shaft portion 16 and opposed to the outer circumferential surface of the shaft portion 16; and a distal end face 18a which is formed at the free end 18FE and is substantially perpendicular to the axial direction of the shaft portion 16. There is no parting line on the distal end face 18a.

Other aspects and advantages of the invention will be apparent from the following description and the appended claims.

DETAILED DESCRIPTION OF THE EXEMPLARY EMBODIMENTS

Hereinafter, an exemplary embodiment of the invention will be described by reference to accompanying drawings.

A vehicle headlamp 1 is to be mounted at each of left and right end portions of a front end portion of a vehicle body.

Figure 1:
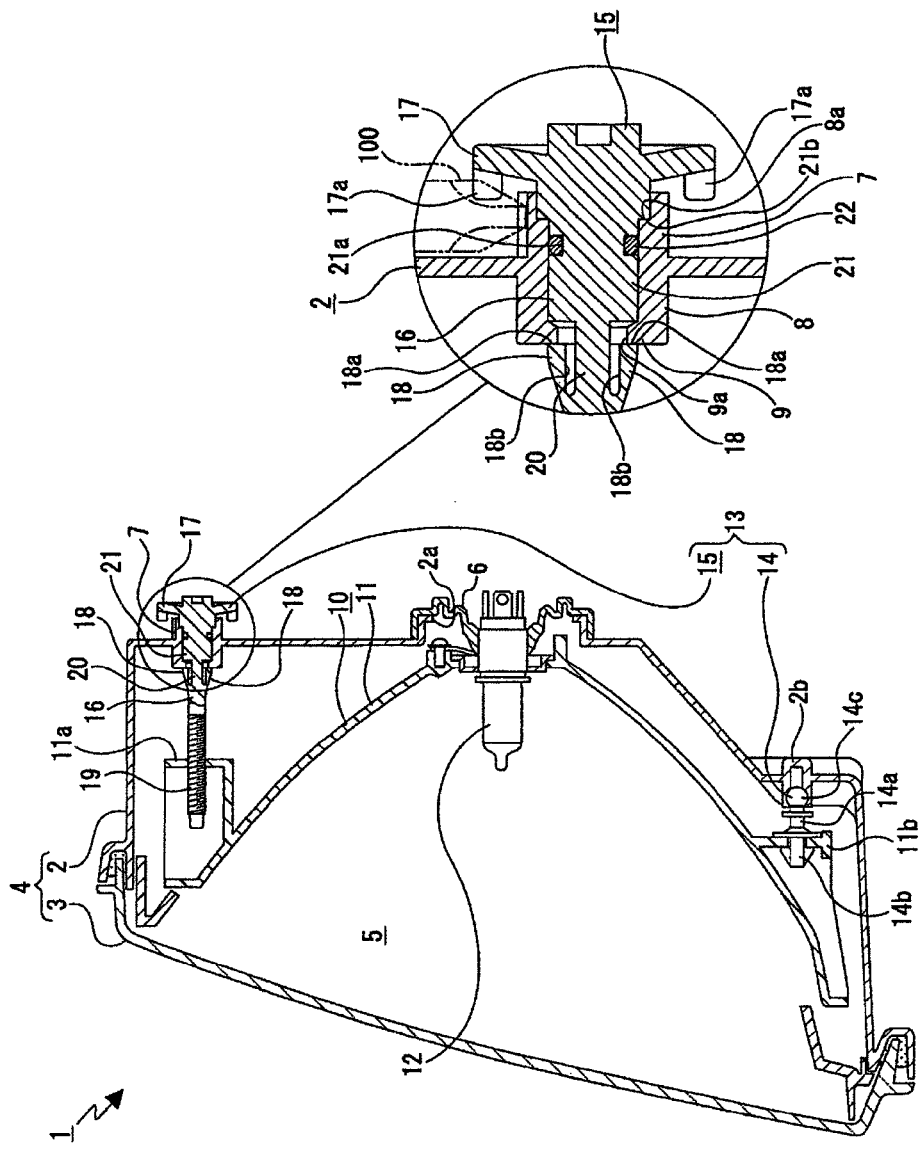
FIG. 1 is a vertical sectional view of a vehicle headlamp which shows together with Figs. 2 to 5 an exemplary embodiment of an optical axis adjusting screw of the invention.

As is shown in FIG. 1, the vehicle headlamp 1 includes a lamp body 2 having a recess portion which is opened to a front side and a cover 3 adapted to close the opening of the lamp body 2. A lamp outer casing 4 is defined by the lamp body 2 and the cover 3, and an interior space of the lamp outer casing 4 is formed as a lamp chamber 5.

A mounting hole 2a is formed in a rear end portion of the lamp body 2, and the mounting hole 2a penetrates through the rear end portion in a front-rear direction. A back cover 6 is attached to the mounting hole 2a.

Screw support portions 7, 7 (only one of which is shown in FIG. 1) are provided at the rear end portion of the lamp body 2 so as to be spaced apart from each other in a vertical direction. The screw support portion 7 includes a cylindrical supporting cylindrical portion 8 which extends in the front-rear direction and a flange portion 9 which projects inwards from a front end portion of the supporting cylindrical portion 8. A restricting surface 8a is formed on an inner surface side of the supporting cylindrical portion 8 in a position lying closer to a rear end of the supporting cylindrical portion 8. The restricting surface 8a is oriented to the rear. An insertion hole 9a is formed in the flange portion 9 so as to penetrate therethrough in the front-rear direction.

A pivot supporting portion 2b is formed at a lower end portion of the lamp body 2.

A lamp unit 10 is disposed in the lamp chamber 5. The lamp unit 10 has a reflector 11 and a light source 12 which is mounted at a rear end portion of the reflector 11 and is supported on the lamp body 2 so as to be tilted freely by an optical axis adjusting mechanism 13.

Screw supporting portions 11a, 11a and a pivot connecting portion 11b are provided on the reflector 11. The screw supporting portions 11a, 11a are positioned so as to be spaced apart in the vertical direction, and the pivot connecting portion 11b is positioned at a lower end portion of the reflector 11. The pivot connecting portion 11b is provided directly below one of the screw supporting portions 11a, 11a.

The light source 12 penetrates through the back cover 6 at a rear end portion thereof so as to project to the rear.

The optical axis adjusting mechanism 13 includes a pivot member 14 and two optical axis adjusting screws 15, 15.

The pivot member 14 has a shaft portion 14a, a connecting portion 14b provided at a front end portion of the shaft portion 14a and a spherical portion 14c provided at a rear end portion of the shaft portion 14a. The pivot member 14 is supported in such a state that the connecting portion 14b is connected to the connecting portion 11b of the reflector 11 and the spherical portion 14c is rotatably connected to the pivot supporting portion 2b of the lamp body 2.

The optical axis adjusting screw 15 is formed of a resin as an integral unit through injection molding employing a mold.

Figure 2:
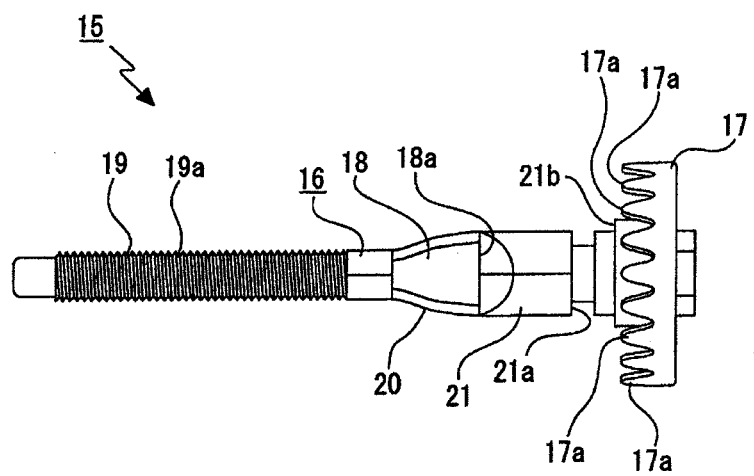
FIG. 2 is an enlarged plan view of the optical axis adjusting screw.
Figure 3:
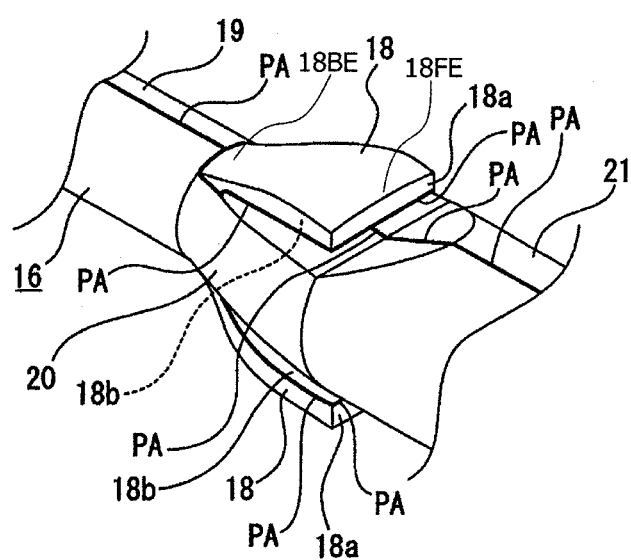
FIG. 3 is an enlarged perspective view showing part of the optical axis adjusting screw.

As is shown in FIGS. 2 and 3, the optical axis adjusting screw 15 includes a shaft portion 16 which is formed into a shaft shape and extending in the front-rear direction, a gear portion 17 which is connected to a rear end of the shaft portion 16 and a pair of elastic engagement portions 18, 18 which project from an outer circumferential surface of the shaft portion 16.

The shaft portion 16 includes a threads formed portion 19, an intermediate portion 20 and a support shaft portion 21 which are provided continuously in that order from a front end thereof. The threads formed portion 19 is made smaller in diameter than the support shaft portion 21, and the intermediate portion 20 is formed so as to be increased in diameter as it extends to the rear.

A threaded portion 19a is formed on the threads formed portion 19 except front and rear end portions thereof.

A supporting groove 21a is formed in the support shaft portion 21 so as to extend in a circumferential direction. A restricted surface 21b is formed on the support shaft portion 21 at the rear of the supporting groove 21a, and this restricted surface 21b is oriented to the front.

The gear portion 17 projects outwards from a rear end portion of the shaft portion 16. Gear teeth 17a, 17a, . . . are formed in an outer circumferential portion of a front surface thereof.

The elastic engagement portions 18, 18 are each provided so as to connect to the rear end portion of the threads formed portion 19 of the shaft portion 16. The elastic engagement portions 18, 18 are each formed so as to be displaced outwards as they extend to the rear and can elastically be deformed in a direction in which they move away from or are brought into contact with the outer circumferential surface of the shaft portion 16. Sliding surfaces (distal end faces) 18a, 18a are formed on the elastic engagement portions 18, 18, and these sliding surfaces 18a, 18a are oriented to the rear. (That is, each of the elastic engagement portions 18 includes a base end 183E fixed to the outer circumferential surface of the shaft portion 16, and a free end 18FE at an opposite side of the base end 183E in an axial direction of the shaft portion 16. The distal end face 18a is formed at the free end 18FE and is substantially perpendicular to the axial direction of the shaft portion 16.)

The optical axis adjusting screws 15, 15 are supported rotatably on the lamp body 2 (refer to FIG. 1). The optical axis adjusting screw 15 is supported on the lamp body 2 by the shaft portion 16 and the elastic engagement portions 18, 18 being inserted into the insertion hole 9a in the screw supporting portion 7 from the rear. An O-ring 22 is mounted in the supporting groove 21a in the optical axis adjusting screw 15. In such a state that the optical axis adjusting screw 15 is supported on the lamp body 2, the O-ring 22 is tightly attached to an inner circumferential surface of the supporting cylindrical portion 8 of the screw supporting portion 7, whereby the intrusion of water from the insertion hole 9a into the lamp chamber 5 is prevented.

When the elastic engagement portions 18, 18 are inserted into the insertion hole 9a in the screw supporting portion 7, the elastic engagement portions 18, 18 are individually brought into sliding contact with an opening edge of the insertion hole 9a and are elastically deformed in a direction in which they approach the shaft portion 16. When they are entirely inserted through the insertion hole 9a, the elastic engagement portions 18, 18 are elastically restored to their initial positions, whereby sliding contact surfaces 18a, 18a of the elastic engagement portions 18, 18 are brought into contact with a front surface of the flange portion 9. Consequently, a rearward dislodgement of the optical axis adjusting screw 15 from the lamp body is prevented.

In such a state that the optical axis adjusting screw 15 is supported on the lamp body 2, the restricted surface 21b is brought into contact with the restricting surface 8a formed on the supporting cylindrical portion 8 of the screw supporting portion 7. Consequently, a forward movement of the optical axis adjusting screw 15 relative to the lamp body 2 is restricted.

The threaded portions 19a, 19a of the optical axis adjusting screws 15, 15 are screwed into the corresponding screw holding portions 11a, 11a of the reflector 11.

In the vehicle headlamp 1, when the optical axis adjusting screw 15 is operated to rotate, the screw holding portion 11a is fed in a direction in accordance with the rotating direction of the optical axis adjusting screw 15 (substantially in the front-rear direction), whereby the reflector 11 is tiled relative to the lamp body 2. The rotation of the optical axis adjusting screw 15 is effected by operating to rotate the gear portion 17 with a tool 100 such as a screw driver, for example.

When the optical axis adjusting screw 15 positioned upwards is rotated, the reflector 11 is tilted in the vertical direction relative to the lamp body 2 on the optical axis adjusting screw 15 positioned downwards and the spherical portion 14c of the pivot member 14 as fulcrums, whereby an aiming adjustment in the vertical direction is effected.

When the optical axis adjusting screw 15 positioned downwards is rotated, the reflector 11 is tilted in the horizontal direction relative to the lamp body 2 on the optical axis adjusting screw 15 positioned upwards and the spherical portion 14c of the pivot member 14 as fulcrums, whereby an aiming adjustment in the horizontal direction is effected.

Figure 4:
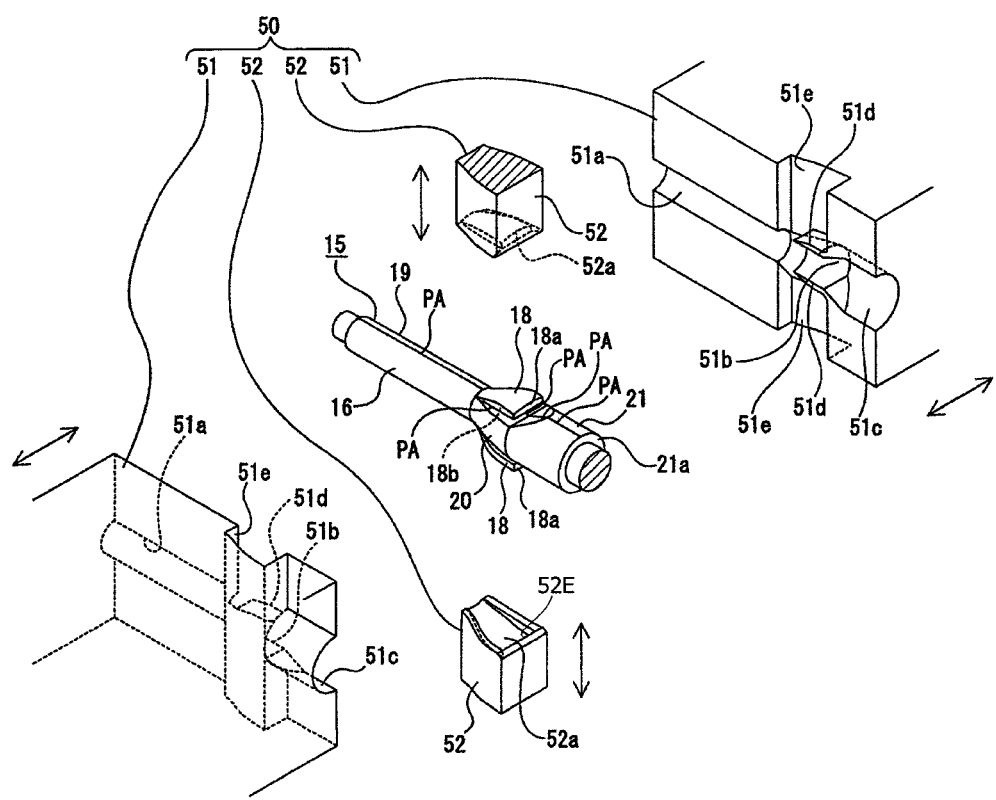
FIG. 4 is a perspective view showing a mold and the optical axis adjusting screw with part omitted.
Figure 5:
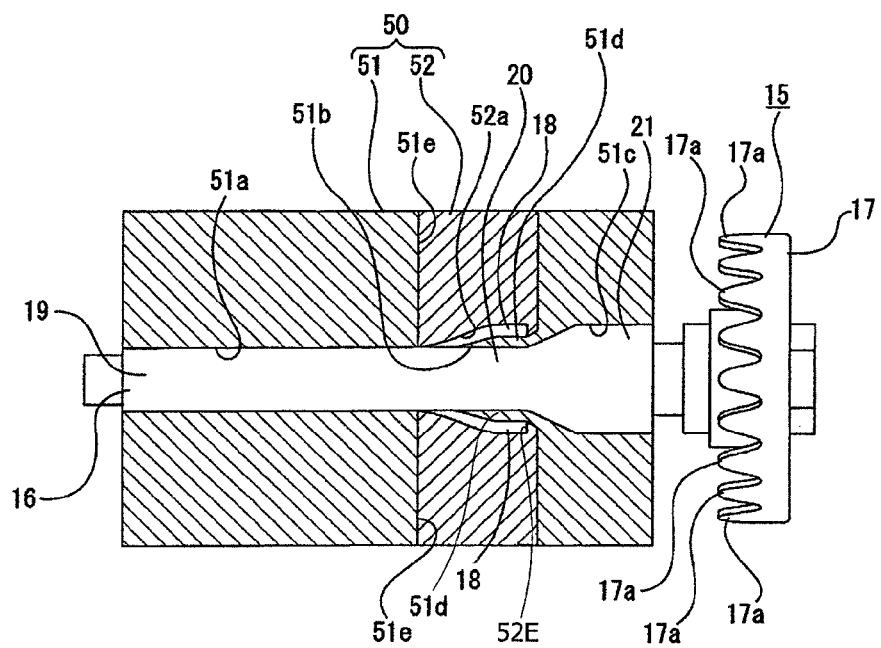
FIG. 5 is a partially sectional side view showing a state in which the optical axis adjusting screw is formed by the mold.

Hereinafter, a method for manufacturing the optical axis adjusting screw 15 will be described (refer to FIGS. 4 and 5).

As has been described above, the optical axis adjusting screw 15 is formed of a resin through injection molding employing a mold.

A mold 50 has a pair of dies 51, 51 which are movable in the right-left direction and a pair of sliders 52, 52 which are movable in the vertical direction. The pair of dies 51, 51 respectively include mating surfaces, and the mating surfaces form a mating plane extending in the vertical direction when the dies 51, 51 mate to each other. Each of the sliders 52, 52 includes a forming recess portion 52a (referred in detail in the below) which is opened in the vertical direction.

In each of the dies 51, a first recess portion 51a for forming the threads formed portion 19, a second recess portion 51b for forming the intermediate portion 20, and a third recess portion 51c for forming the support shaft portion 21 are formed. That is, the first recess portion 51a, the second recess portion 51b, and the third recess portion 51c form a cavity (generally extending in the front-rear direction) for forming the adjusting screw 15. A pair of projecting portions 51d, 51d (which project into the cavity) are provided on the die 51 at upper and lower sides of the second recess portion 51b so as to form spaces that are to be defined between the intermediate portion 20 and the elastic engagement portions 18, 18. Sliding spaces 51e, 51e are formed in the die 51 in opposite positions lying across the second recess portion 51b with the projecting portions 51d, 51d positioned therebetween so that sliders 52, 52 are slid therein, respectively.

The forming recess portion 52a for forming the elastic engagement portion 18 is formed in a lengthwise end face of the slider 52. The elastic engagement portion 18 is formed by a molten resin being filled in the forming recess portion 52a. All surfaces of the elastic engagement portion 18 except an opposed surface 18b which confronts the intermediate portion 20 are formed by the forming recess portion 52a. (Further, the opposed surface 18b is a surface which is apart from the outer circumferential surface of the shaft portion 16 and opposed to the outer circumferential surface of the shaft portion 16.) The opposed surface 18b of the elastic engagement portion 18 is formed by the projecting portions 51d, 51d of the dies 51, 51. In an end part of the forming recess portion 52a in the front-rear direction, an end wall surface 52E is provided. The end wall surface 52E of the forming recess portion 52a intersects with the mating plane between the right and left dies 51, 51 and is substantially perpendicular to the front-rear direction. By the end wall surface 52E of the forming recess portion 52a, the sliding surface 18a of the elastic engagement portion 18 is formed.

Consequently, a parting line PA that is to result from parting the mold 50 is formed on an outer circumferential edge of the opposed surface 18b of the elastic engagement portion 18 but is not formed on the sliding surface 18a of the elastic engagement portion 18. (In a condition where the dies 51, 51 and the slider 52 are clamped for performing a molding process, a vertical end portion of the slider 52 contacts with a part of a vertical end portion of the projecting portion 51d. The parting line PA on the elastic engagement portion 18 is formed on a contact line between the slider 52 and the projecting portion 51d.)

After the mold 50 has been unclamped, a cutting operation is performed on the threads formed portion 19 so as to form the threaded portion 19a, whereby the optical axis adjusting screw 15 is formed.

Thus, as has been described heretofore, in the optical axis adjusting screw 15, the parting lines PA are formed on the outer circumferential edges of the inner surfaces (the opposed surfaces) 18b, 18b of the elastic engagement portions 18, 18 but are not formed on the sliding contact surfaces thereof. Therefore, during an adjusting operation of the optical axis of light, even when the optical axis adjusting screw 15 is rotated relative to the lamp body 2, no parting line PA is brought into sliding contact with the inner surface of the lamp body 2.

Consequently, a generation of foreign matters such as abrasion dust which are produced when the optical axis adjusting screw 15 is rotated can be prevented. In addition, the occurrence of abrasion of the inner surface of the lamp body 2 can also be suppressed.

While the parting line PA is formed on the outer circumferential edge of the inner surface (the opposed surface 18b) of the elastic engagement portion 18 in the above description, the parting line PA may be formed on an outer circumferential surface of an outer surface of the elastic engagement portion 18. (In the example where the parting line PA is formed on the outer circumferential surface of the outer surface of the elastic engagement portion 18, the forming recess portion 52a may be formed on the projecting portion 51d.)

As this occurs, too, since no parting line PA is formed on the sliding surface 18a, the foreign matters such as abrasion dust produced when the optical axis adjusting screw 15 is rotated can be prevented, and the occurrence of abrasion of the inner surface of the lamp body 2 can also be suppressed.

In the above description, while the lamp unit 10 is described as being supported on the lamp body 2 by the optical axis adjusting mechanism 13, a configuration may be adopted in which a bracket for supporting the lamp unit 10 is disposed in the lamp chamber 5 so that the bracket is supported on the lamp body 2 by the optical axis adjusting mechanism 13 so as to be tilted. As this occurs, the bracket and the lamp unit 10 are tilted together relative to the lamp body 2 by the operation of the optical axis adjusting mechanism 13.

While description has been made in connection with the specific exemplary embodiment and modified examples thereof, it will be obvious to those skilled in the art that various changes and modifications may be made therein without departing from the present invention. It is aimed, therefore, to cover in the appended claims all such changes and modifications falling within the true spirit and scope of the present invention.

In accordance with the embodiments of the invention, an optical axis adjusting screw 15 is provided with: a shaft portion 16 including a threaded portion 19a and a support shaft portion 21; a gear portion 17 connected to the shaft portion 16; and an elastic engagement portion 18. The elastic engagement portion 18 is provided with: a base end 18BE fixed to an outer circumferential surface of the shaft portion 16; a free end 18FE at an opposite side of the base end 18BE in an axial direction of the shaft portion 16; an opposed surface 18b which is apart from the outer circumferential surface of the shaft portion 16 and opposed to the outer circumferential surface of the shaft portion 16; and a distal end face 18a which is formed at the free end 18FE and is substantially perpendicular to the axial direction of the shaft portion 16. There is no parting line on the distal end face 18a.

Consequently, in the optical axis adjusting screw, surfaces of the elastic engagement portions on which no parting line is formed are allowed to slide against the inner surface of the lamp body.

Thus, the generation of foreign matters such as abrasion dust which are produced during the optical axis adjusting operation can be prevented, and the generation of abrasion of the inner surface of he lamp body can be suppressed.

Further, in accordance with the embodiments of the invention, an optical axis adjusting screw 15 adapted to adjust an irradiating direction of light emitted from a light source 12 of a lamp unit 10 disposed in a lamp chamber 5 defined by a lamp body 2 having an opening and a cover 3 which closes the opening of the lamp body 2 and formed of a resin through injection molding which employs a mold may be provided with: a shaft portion 16 having a threaded portion 19a which is screwed into the lamp unit 10 or a bracket which holds the lamp unit 10 and a support shaft portion 21 which is to be rotatably supported on the lamp body 2; a gear portion 17 which is connected to one end of the shaft portion 16 and which is operated to rotate; and a plurality of elastic engagement portions 18 which is connected to an outer circumferential surface of the shaft portion 16, which are displaced in a direction in which they are spaced apart from the shaft portion 16 as they approach the gear portion 17 from the shaft portion 16, which can be elastically deformed in a direction in which they move away from or are brought into contact with the shaft portion 16, and which are brought into contact with an inner surface of the lamp body 2 at distal end faces 18a thereof when the support shaft portion 21 is supported on the lamp body 2. A parting line PA produced on the elastic engagement portions 18 when they are molded by the mold may be formed on an outer circumferential edge of an outer surface or on an outer circumferential edge of an inner surface 18b of the elastic engagement portions 18.

Further, in accordance with the embodiments of the invention, a mold 50 for molding an optical axis adjusting screw 15 may be provided with: right and left dies 51, 51 in which a mating plane extending in a vertical direction is formed between the right and left dies 51, 51 in a condition in which the right and left dies 51, 51 mate to each other; and a slider 52 which is movable in the vertical direction with respect to the right and left dies 51, 51. A cavity 51a, 51b, 51c for molding the adjusting screw 15 and generally extending in a front-rear direction may be formed in the condition in which the right and left dies 51, 51 mate to each other. The each of the right and left dies 51, 51 may include a projecting portion 51d projecting into said cavity. A forming recess portion 52a opened in the vertical direction may be formed in either the slider 52 or the projecting portion 51d. An end wall surface 52E may be provided in an end part of the forming recess portion 52a in the front-rear direction, and the end wall surface 52E maybe substantially perpendicular to the front-rear direction and intersects with said mating plane between the right and left dies 51, 51.

In the above mold, a part of a vertical end portion of the slider 52 may contact with a part of a vertical end portion of the projecting portion 51d, in a condition where the dies 51, 51 and the slider 52 are clamped for performing a molding process.

DESCRIPTION OF REFERENCE NUMERALS AND SIGNS

2 lamp body; 3 cover; 10 lamp unit; 12 light source; 15 optical adjusting screw; 16 shaft portion; 17 gear portion; 18 elastic engagement portion; 21 support shaft portion; PA parting line; 50 mold.

What is claimed is:

1. An optical axis adjusting screw adapted to adjust an irradiating direction of light emitted from a light source of a lamp unit disposed in a lamp chamber defined by a lamp body having an opening and a cover which closes the opening of the lamp body and formed of a resin through injection molding which employs a mold, the optical axis adjusting screw comprising:
    a shaft portion having a threaded portion which is screwed into the lamp unit or a bracket which holds the lamp unit and a support shaft portion which is to be rotatably supported on the lamp body;
    a gear portion which is connected to one end of the shaft portion and which is operated to rotate; and
    a plurality of elastic engagement portions which is connected to an outer circumferential surface of the shaft portion, which are displaced in a direction in which the plurality of the elastic engagement portions are spaced apart from the shaft portion as the plurality of the elastic engagement portions approach the gear portion from the shaft portion, which can be elastically deformed in a direction in which the plurality of the elastic engagement portions move away from or are brought into contact with the shaft portion, and which are brought into contact with an inner surface of the lamp body at distal end faces thereof when the support shaft portion is supported on the lamp body,
    wherein a parting line produced on the elastic engagement portions when molded by the mold is formed on an entire outer circumferential edge of outer surfaces or on an entire outer circumferential edge of inner surfaces of the elastic engagement portions.

2. The optical axis adjusting screw of claim 1, wherein there is no parting line on the distal end face.

3. An optical axis adjusting screw adapted to adjust an irradiating direction of a lamp unit, the optical axis adjusting screw comprising:
    a shaft portion including a threaded portion and a support shaft portion;
    a gear portion connected to the shaft portion; and
    an elastic engagement portion,
    wherein the elastic engagement portion includes
        a base end fixed to an outer circumferential surface of the shaft portion,
        a free end at an opposite side of the base end in an axial direction of the shaft portion,
        an opposed surface which is apart from the outer circumferential surface of the shaft portion and opposed to the outer circumferential surface of the shaft portion, and
        a distal end face which is formed at the free end and is substantially perpendicular to the axial direction of the shaft portion, and
    wherein there is no parting line on the distal end face, and wherein a parting line is formed on an entire outer circumferential edge of outer surfaces or on an entire outer circumferential edge of inner surfaces of the elastic engagement portion.

* * * * *